(12) United States Patent
Kotian et al.

(10) Patent No.: US 9,018,298 B2
(45) Date of Patent: Apr. 28, 2015

(54) FLAME RETARDED FORMULATIONS

(75) Inventors: Vijay M. Kotian, Gonzales, LA (US); Govindarajulu Kumar, Baton Rouge, LA (US); Timothy John St. Romain, Baton Rouge, LA (US)

(73) Assignee: Albemarle Corporation, Baton Rouge, LA (US)

( * ) Notice: Subject to any disclaimer, the term of this patent is extended or adjusted under 35 U.S.C. 154(b) by 406 days.

(21) Appl. No.: 12/668,998

(22) PCT Filed: Jul. 31, 2008

(86) PCT No.: PCT/US2008/071687
§ 371 (c)(1),
(2), (4) Date: Jan. 13, 2010

(87) PCT Pub. No.: WO2009/020822
PCT Pub. Date: Feb. 12, 2009

(65) Prior Publication Data
US 2010/0190896 A1    Jul. 29, 2010

Related U.S. Application Data

(60) Provisional application No. 60/954,516, filed on Aug. 7, 2007, provisional application No. 60/954,513, filed on Aug. 7, 2007, provisional application No. 60/981,005, filed on Oct. 18, 2007, provisional application No. 60/982,028, filed on Oct. 23, 2007, provisional application No. 61/056,303, filed on May 27, 2008.

(51) Int. Cl.
| | |
|---|---|
| *C08K 5/03* | (2006.01) |
| *C08K 3/00* | (2006.01) |
| *C08K 5/00* | (2006.01) |
| *C08L 23/08* | (2006.01) |

(52) U.S. Cl.
CPC ............ *C08K 3/0058* (2013.01); *C08K 5/0066* (2013.01); *C08L 23/0815* (2013.01); *C08L 2201/00* (2013.01)

(58) Field of Classification Search
CPC ...... C08K 3/0008; C08K 3/04; C08K 5/0008; C08L 23/0815; C08L 23/04; C08L 23/10; C08L 2205/02; C08L 2205/03; C08L 2666/06; B06C 19/002
USPC ................. 524/464, 81, 570, 577, 522, 261; 252/601
See application file for complete search history.

(56) References Cited

U.S. PATENT DOCUMENTS

| | | | |
|---|---|---|---|
| 6,232,377 B1 * | 5/2001 | Hayashi et al. | 524/100 |
| 6,359,021 B2 * | 3/2002 | Bambara et al. | 521/50 |
| 6,472,042 B1 * | 10/2002 | Dibbern et al. | 428/95 |
| 2005/0137311 A1 * | 6/2005 | Muylem et al. | 524/464 |
| 2006/0100335 A1 | 5/2006 | Yalvac et al. | |

FOREIGN PATENT DOCUMENTS

| | | | |
|---|---|---|---|
| JP | 10182894 A | | 7/1998 |
| WO | WO98/38245 | * | 9/1998 |
| WO | WO9838245 A | | 9/1998 |
| WO | WO 2005/023924 | * | 9/2005 |

* cited by examiner

*Primary Examiner* — James J Seidleck
*Assistant Examiner* — Deve E Valdez
(74) *Attorney, Agent, or Firm* — James A. Jubinsky; Marcy M. Hoefling; Nathan C. Dunn

(57) ABSTRACT

The present invention relates to the use of pelletized flame retardants and flame retardant compositions in the formation of flame retarded formulations, the resulting flame retarded formulations, and molded and/or extruded articles made from such flame retarded formulations.

9 Claims, No Drawings

FLAME RETARDED FORMULATIONS

REFERENCE TO RELATED APPLICATION

This application is the National Stage of International Patent Appl. No. PCT/US2008/071687, filed on Jul. 31, 2008, which claims priority on U.S. Provisional Application No. 60/954,516 filed on Aug. 7, 2007, U.S. Provisional Application No. 60/954,513 filed on Aug. 7, 2007, U.S. Provisional Application No. 60/981,005 tiled on Oct. 18, 2007, U.S. Provisional Application No. 60/982,028 filed on Oct. 23, 2007, and U.S. Provisional Application No. 61/056,303 filed on May 27, 2008, the disclosures of which are incorporated herein by reference.

SUMMARY OF THE INVENTION

The present invention relates to the use of pelletized flame retardants and flame retardant compositions in the formation of flame retarded formulations, the resulting flame retarded formulations, and molded and/or extruded articles made from such flame retarded formulations.

BACKGROUND OF THE INVENTION

Flame retardants are currently widely used to provide flame retardancy to a variety of synthetic resins. During transportation and processing operations, these flame retardants can create unwanted airborne dusts. Thus, there is currently a need in the art for a flame retardant product with reduced dusting problems while at the same time is usable in a wide range of synthetic resins without causing processing problems for the end-user.

Further, as with most products, it would be desirable to utilize less flame retardant in a flame retarded formulation and achieve similar flame retardant and mechanical properties to a flame retarded formulation comprising conventional amounts of flame retardant.

THE INVENTION

The inventors hereof have unexpectedly discovered that by using the compositions and pellets described herein, users can achieve similar or superior flame retardancy and mechanical properties at equivalent loadings of flame retardant. For example, the inventors hereof have unexpectedly discovered that at equivalent loadings in a flame retarded formulation, one can achieve the same or similar level of flame retardancy using a pellet or composition as described herein or a conventional amount of the same flame retardant. In other words, if one was to produce a flame retarded formulation containing about 15 wt. % flame retardant or 15 wt. % of pellets or compositions as described herein, both based on the total weight of the flame retarded formulation, the flame retarded formulation made from the pellets/compositions described herein would achieve the same or superior flame retardancy. However, the flame retarded formulation made from the pellet/compositions would have a lower level of flame retardant, i.e. for a pellet or composition containing about 87 wt. % flame retardant, based on the total weight of the pellet or composition, a 15 wt. %, based on the total weight of the flame retarded formulation, loading level would equate to a flame retardant loading level of about 13.1 wt. % (15% of 87%), based on the total weight of the flame retarded formulation. Further, similar or equivalent levels of flame retardancy, e.g. V-0, V-2, etc., can be achieved at these lower loading levels while providing equivalent or superior mechanical properties such as impact strength and elongation at break. Thus, equivalent or superior flame retardant properties and mechanical properties can be achieved at lower loadings of flame retardant. Further, these equivalent or superior flame retardant properties can be achieved while the flame-retarded formulation comprises more flammable material than a flame retarded formulation using a conventional loading of flame retardant.

Pellets and Compositions

The pellets and compositions of the present invention comprise a flame retardant and an alpha-olefin copolymer. The alpha-olefin copolymer used herein is a linear or substantially linear alpha-olefin interpolymer. The term "interpolymer" is used herein to indicate a copolymer, or a terpolymer, or the like. That is, at least one alpha-olefin comonomer is polymerized with an alpha-olefin monomer, preferably ethylene, to make the interpolymer. Other unsaturated monomers usefully copolymerized with alpha-olefin monomers, preferably ethylene, include, for example, ethylenically unsaturated monomers, conjugated (e.g., piperylene) or nonconjugated dienes (e.g., ethylidene norbornadiene), polyenes, etc. Preferred comonomers include the $C_3$-$C_{20}$ alpha-olefins especially propene, is obutylene, 1-butene, 1-hexene, 4-methyl-1-pentene, and 1-octene. Other preferred comonomers (with ethylene) include styrene, halo- or alkyl substituted styrenes, tetrafluoroethylene, vinylbenzocyclobutane, 1,4-hexadiene, and naphthenics (e.g., cyclopentene, cyclohexene and cyclooctene). Thus, it is preferred that the linear and substantially linear alpha-olefin interpolymers used in the practice of the present invention be alpha-olefin copolymers of ethylene with at least one $C_3$-$C_{20}$ alpha-olefin and/or $C_4$-$C_{18}$ diolefins, preferably $C_5$-$C_{20}$ alpha-olefin copolymers, most preferably $C_7$-$C_{20}$ alpha-olefin copolymers. Copolymers of ethylene and 1-octene are especially preferred.

As used herein, the phrase "linear alpha-olefin interpolymer(s)" means that the olefin polymer does not have long chain branching. That is, the linear alpha-olefin interpolymer has an absence of long chain branching, as for example the linear low density polyethylene polymers or linear high density polyethylene polymers made using uniform branching, i.e. homogeneously branched, distribution polymerization processes, see for example U.S. Pat. No. 3,645,992, which is incorporated herein by reference, and are those in which the comonomer is randomly distributed within a given interpolymer molecule and wherein substantially all of the interpolymer molecules have the same monomer/comonomer ratio within that interpolymer. Thus, the phrase "linear alpha-olefin interpolymer(s)" does not refer to high pressure branched polyethylene which is known to those skilled in the art to have numerous long chain branches.

It should be noted that the phrase "substantially linear" when used in conjunction with "alpha-olefin interpolymer(s)" herein means that the polymer backbone has long chain branching and is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/ 1000 carbons to about 1 long chain branches/1000 carbons.

"Long chain branching" as used herein means a chain length of at least 6 carbons, above which the length cannot be distinguished using $^{13}C$ nuclear magnetic resonance spectroscopy. The long chain branch can be as long as about the same length as the length of the polymer backbone. However, the long chain branch is longer than the short chain branch resulting from incorporation of the comonomer. For example, an ethylene/1-octene long chain branched copolymer will have a short chain branch length of six carbons and a long chain branch length of at least seven carbons. Long chain branching can be determined for ethylene homopolymers and certain copolymers by using $^{13}$C nuclear magnetic resonance spectroscopy and is quantified using the method of Randall (*Rev. Macromol. Chem. Phys.*, C29 (2&3), p. 285-297), the disclosure of which is incorporated herein by reference.

The linear and substantially linear alpha-olefin interpolymers used in the present invention can also be described as homogenous, the homogeneity typically described by the Short Chain Branch Distribution Index ("SCBDI") or Composition Distribution Branch Index ("CDBI"), and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation ("TREF") as described, for example, in Wild et al, *Journal of Polymer Science, Poly. Phys. Ed.*, Vol. 20, p. 441 (1982), in U.S. Pat. Nos. 5,008,204; 5,246,783; 5,322,728; 4,798,081; and/or 5,089,321, which are incorporated herein by reference. The SCBDI or CDBI of the linear and substantially linear alpha-olefin interpolymers used in the present invention is greater than about 50 percent, preferably greater than about 60 percent, more preferably greater than about 70 percent and especially greater than about 90 percent. Blends (either "in situ reactor" blend or discrete polymer blends) of homogeneously branched linear or substantially linear ethylene/alpha-olefin interpolymers with heterogeneously branched polyethylene are also suitable as long as the blends meet the CDBI and molecular weight distribution limits defined herein.

The homogeneous alpha-olefin interpolymers used in this invention essentially lack a measurable "high density" fraction as measured by the TREF technique, i.e. the homogeneous alpha-olefin interpolymers do not contain a polymer fraction with a degree of branching less than or equal to 2 methyls/1000 carbons. The homogeneous ethylene/alpha-olefin interpolymers also do not contain any highly short chain branched fraction, i.e., the homogeneous alpha-olefin interpolymers do not contain a polymer fraction with a degree of branching equal to or more than 30 methyls/1000 carbons.

The substantially linear alpha-olefin interpolymers suitable for use in the present invention are those described in detail in U.S. Pat. Nos. 5,272,236, 5,278,272, and 6,472,042, which are all incorporated herein by reference. The substantially linear alpha-olefin interpolymers useful in the present invention are those in which the comonomer is randomly distributed within a given interpolymer molecule and wherein substantially all of the interpolymer molecules have the same ethylene/comonomer ratio within that interpolymer. Both the homogeneously branched linear and the substantially linear alpha-olefin polymers and interpolymers also have a single melting peak, as opposed to heterogeneously branched linear ethylene polymers, which have two or more melting peaks.

The density (as measured in accordance with ASTM D-792) of the linear or substantially linear alpha-olefin interpolymers suitable for use in the present invention is generally from about 0.85 g/cm$^3$ to about 0.92 g/cm$^3$, preferably from about 0.86 g/cm$^3$ to about 0.90 g/cm$^3$, more preferably from about 0.865 g/cm$^3$ to about 0.89 g/cm$^3$, and especially from about 0.865 g/cm$^3$ to about 0.88 g/cm$^3$.

The molecular weight of the linear or substantially linear alpha-olefin interpolymers suitable for use in the present invention is conveniently indicated using a melt index measurement according ASTM D-1238, measured under conditions of 190° C./2.16 kg (formerly known as "Condition (E)" and also known as $I_2$). Melt index is inversely proportional to the molecular weight of the polymer. Thus, the higher the molecular weight, the lower the melt index, although the relationship is not linear. The melt index for the linear or substantially linear ethylene/alpha-olefin polymers useful herein is generally from about 0.01 grams/10 minutes (g/10 min) to about 1000 g/10 min, preferably from about 1 g/10 min to about 100 g/10 min, and especially from about 5 g/10 min to about 100 g/10 min.

Another measurement useful in characterizing the molecular weight of the linear or substantially linear alpha-olefin interpolymers suitable for use herein is conveniently indicated using a melt index measurement according to ASTM D-1238, measured under conditions of 190° C./10 kg (formerly known as "Condition (N)" and also known as $I_{10}$). The ratio of the $I_{10}$ and the $I_2$ melt index terms is the melt flow ratio and is designated as $I_{10}/I_2$. For the substantially linear ethylene/alpha-olefin polymers used in the compositions of the invention, the $I_{10}/I_2$ ratio indicates the degree of long chain branching, i.e., the higher the $I_{10}/I_2$ ratio, the more long chain branching in the polymer. The $I_{10}/I_2$ ratio of the substantially linear ethylene/alpha-olefin polymers is preferably up to about 50, more preferably up to about 15. In exemplary embodiments, the $I_{10}/I_2$ ratio of the linear homogeneously branched ethylene/alpha-olefin interpolymers suitable for use herein is about 6.

The "processing index" or "rheological processing index" ("PI") is the apparent viscosity (in kpoise) of a polymer measured by a gas extrusion rheometer ("GER"). The gas extrusion rheometer is described by M. Shida, R. N. Shroff and L. V. Cancio in Polymer Engineering Science, Vol. 17, no. 11, p. 770 (1977), and in "Rheometers for Molten Plastics" by John Dealy, published by Van Nostrand Reinhold Co. (1982) on page 97-99, both publications of which are incorporated by reference herein in their entirety. All GER experiments are performed at a temperature of 190° C., at nitrogen pressures between 5250 to 500 psig using a 0.0296 in diameter, 20:1 L/D die with an entrance angle of 180°. For the substantially linear alpha-olefin interpolymers used herein, the PI is the apparent viscosity (in kpoise) of a material measured by GER at an apparent shear stress of 2.15×10$^6$ dyne/cm$^2$. The substantially linear alpha-olefin interpolymers used herein preferably have a PI in the range of about 0.01 kpoise to about 50 kpoise, preferably about 15 kpoise or less. The substantially linear alpha-olefin interpolymers used herein have a PI less than or equal to about 70% of the PI of a comparative linear ethylene/alpha-olefin copolymer, an $I_2$, $M_w/M_n$, and density, each of which is within 10 percent of that of substantially linear alpha-olefin interpolymer.

The substantially linear alpha-olefin interpolymers suitable for use in the present invention can also be described by their surface melt fracture and/or gross melt fracture. Surface melt fracture occurs under apparently steady flow conditions and ranges in detail from loss of specular gloss to the more severe form of "sharkskin". In this disclosure, the onset of surface melt fracture ("OSMF") of the substantially linear ethylene/alpha-olefin interpolymers is characterized at the beginning of losing extrudate gloss at which the surface roughness of extrudate can only be detected by 40× magnification. The critical shear rate at onset of surface melt fracture for the substantially linear alpha-olefin interpolymers suitable for use in the present invention is at least 50 percent greater than the critical shear rate at the onset of surface melt fracture of a linear ethylene/alpha-olefin polymer having a $I_2$, $M_w/M_n$, and density, each of which is within 10 percent of that of the substantially linear alpha-olefin interpolymer.

Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture ("OSMF") and onset of gross melt fracture ("OGMF") will be used herein based on the changes of surface roughness and configurations of the extrudates extruded by a GER.

The linear and substantially linear alpha-olefin interpolymers suitable for use herein can also be described the molecular weight distribution, $M_w/M_n$, which can be calculated according to the method outlined in U.S. Pat. No. 6,472,042. The molecular weight distribution of the linear and substantially linear alpha-olefin interpolymers suitable have a molecular weight distribution of less than about 3.5, preferably in the range of from about 1.5 to about 2.5.

In some embodiments, the substantially linear alpha-olefin interpolymers suitable for use herein are characterized as having: a) a melt flow ratio, $I_{10}/I_2 \geq 5.63$, b) a molecular weight distribution, $M_w/M_n$, defined by the equation: $M_w/M_n \leq (I_{10}/I_2)-4.63$, and c) a critical shear rate at onset of surface melt fracture of at least 50 percent greater than the critical shear rate at the onset of surface melt fracture of a linear olefin polymer having an $I_2$, $M_w/M_n$, and density, each of which is within 10 percent of that of the substantially linear ethylene/alpha-olefin interpolymer. "Melt index" or "$I_2$" as used herein is measured in accordance with ASTM D-1238 (190/2.16) and "$I_{10}$" is measured in accordance with ASTM D-1238 (190/10).

In some embodiments, the substantially linear alpha-olefin copolymer used herein is selected from substantially linear ethylene/alpha-olefin interpolymers characterized as having: a) a melt flow ratio, $I_{10}/I_2 \geq 5.63$, b) a molecular weight distribution, $M_w/M_n$, defined by the equation: $M_w/M_n \leq (I_{10}/I_2)-4.63$, and c) a processing index ("PI") less than or equal to about 70% of the PI of a linear olefin polymer having a $I_2$, $M_w/M_n$, and density, each of which is within 10 percent of that of the substantially linear ethylene/alpha-olefin interpolymer.

Flame-retardants suitable for use in the pellets and compositions of the present invention include any halogenated flame retardant. In some embodiments the flame retardant is a halogenated flame retardant containing as the halogen constituent bromine, chlorine, or mixtures thereof, preferably bromine. In some embodiments, the halogenated flame retardant is a halogenated diphenyl alkane, wherein the alkane group contains from about 1 to about 4 carbon atoms, preferably 1 to about 3. In some exemplary embodiments, the diphenyl alkane is diphenyl ethane. In a particularly preferred embodiment, the flame retardant is a decabromodiphenyl alkane, preferably decabromodiphenylethane.

The pellets and compositions used in the practice of the present invention comprise greater than 80 wt. %, based on the total weight of the pellet or composition. In some embodiments, the pellets and compositions used in the present invention have a flame retardant concentration of greater than about 85 wt. %, on the same basis, of the flame retardant. In some embodiments, the pellets and compositions used in the present invention comprise greater than 86 wt. % flame retardant, sometimes in the range of from about 86 to about 92 wt. %, and in other embodiments in the range of from about 86 to about 88 wt. %, all on the same basis.

The compositions of the present invention can be formed by combining the flame retardant and alpha-olefin copolymer by any method known to be effective at blending a flame retardant and a synthetic resin. In some embodiments, the compositions are formed by mixing the flame retardant and alpha-olefin copolymer in a batch, e.g. Banbury or roll-mill, or a continuous compounding machine, e.g. twin-screw extruder, single screw extruder, Buss Ko-kneader, or Farrel Continuous Mixer. In some embodiments, the compositions of the present invention are further processed to form pellets, and the pellets can be formed by any pelletizing process known. For example, the composition after exiting the batch or continuous compounding machine can be sheeted onto a two-roll mill and diced into a pellet form or run through an extruder in the form of strands and pelletized using a hot die-face pelletizer or using an under-water pelletizer.

Use in Flame Retardant Formulations

The pellets and composition described herein can be used in a wide variety of flammable resins, depending on the flame retardant component of the pellet or composition. It should be noted that the pellets/compositions of the present invention are compatible with a wide variety of flammable resins.

Thus, in some embodiments, the present invention relates to a flame retarded formulation comprising a flammable resin or polymer and a flame-retarding amount of flame retardant derived from the pellets/compositions of the present invention. By a flame retarding amount, it is generally meant up to about 30 wt. %, in some embodiments in the range of from about 1 to about 30 wt %, of the flame retardant in the pellets/compositions, based on the total weight of the flame retarded formulation. Thus, a loading level of 30 wt. % of the flame retardant would equate to a loading level of about 26.1 wt %, on the same basis, of the flame retardant if a pellet/composition of the present invention was used at an equivalent loading level. It should also be noted that since the flame retardants used in the flame retarded formulations of the present invention are derived from the pellets/compositions of the present invention, the flame retarded formulations will also contain the synthetic resin of the pellet/composition. It should be noted that the amount of flame retardant necessary will depend on the flammable resin utilized, the end application of the flame retarded formulation, and the required level of flame retardancy desired, e.g. V-0 rating, V-2 rating, etc.

While the flame retarded formulations can contain up to about 30 wt. % of flame retardant derived from the pellets or compositions of the present invention, the amount of flame retardant typically contained in the flame retardant formulation is less than that amount conventionally used to achieve the desired flame retardant properties. For example, if the flame retardant used herein is decabromodiphenyl ethane, it is conventionally used in some HIPS applications at a loading level of about 12 wt. %, based on the total weight of the flame retarded formulation, and this formulation typically achieves the desired flame retardant and mechanical properties, depending on the HIPS resin used. However, in the practice of the present invention, 12 wt. % of the pellets or compositions is used to achieve equivalent or superior flame retardant and mechanical properties. Thus, in this application, assuming the pellet or composition contains 87 wt. % decabromodiphenyl ethane, the flame retarded formulation would contain about 10.44 wt % decabromodiphenyl ethane, and this flame retarded formulation would achieve the desired flame retardant and mechanical properties.

As stated above, the pellets and compositions of the present invention can be used in combination with a variety of resins, depending on the flame retardant used in the pellets or compositions. For example, the pellets and compositions can be used in combination with thermoplastic resins such as polyethylene terephthalate, polybutylene terephthalate, polycyclohexylene dimethylene terephthalate, polytrimethylene terephthalate, blends or mixtures of two or more of these, and analogous copolymeric thermoplastic polyesters, especially when filled or reinforced with a reinforcing filler such as glass fiber; polyamide thermoplastics, such as polyamide 6, polyamide 6,6, polyamide 12, etc., again preferably when glass filled.

The pellets/compositions of the present invention can also be used to effectively flame retard styrenic polymers, if the flame retardant component of the pellet or composition is suitable for use in such polymers, such as high impact polystyrenes ("HIPS"), crystal polystyrenes, polyolefins, ABS, MABS, SAN, aromatic polycarbonates, polyphenylene ethers, and polymer blends such as aromatic polycarbonate-ABS blends, polyphenylene ether-polystyrene blends, and similar substances. One group of thermoplastic polymers that can be effectively flame retarded by use of the pellet/compositions described herein is (1) a thermoplastic styrenic polymer, (2) a thermoplastic acrylonitrile-butadiene-styrene polymer, (3) a thermoplastic polyester, (4) a thermoplastic polyamide or (5) a thermoplastic pololefin.

Another group of thermoplastic polymers that can be effectively flame retarded by inclusion of the pellets/compositions of the present invention is polyolefins, if the flame retardant component of the pellet or composition is suitable for use in such polymers. Non-limiting examples of polyolefins include homopolymers of ethylene, propylene, and butylene; copolymers of one or more of such alkylene monomers and any other copolymerizable monomers, for example, ethylene/propylene copolymers, ethylene/ethyl acrylate copolymers and ethylene/vinyl acetate copolymers. Other non-limiting examples of suitable polyolefins include polyethylene; polypropylene; poly-(1-butene); copolymers of ethylene with one or more higher vinyl olefins such as propylene, 1-butene, 1-pentene, 3-methyl-1-butene, 1-hexene, 4-methyl-1-pentene, 1-heptene, 1-octene; copolymers of propylene with one or more higher vinyl olefins; copolymers of ethylene, propylene and one or more diene monomers; and blends or mixtures of any of the foregoing. Methods for preparing such polymers are known and reported in the literature. See for example, Encyclopedia of Polymer Science and Technology, Interscience Publishers, a division of John Wiley & Sons, Inc. New York, especially sections entitled Ethylene Polymers; Propylene Polymers; Butylene Polymers; and Olefin Polymers, and references cited therein; Kirk-Othmer Encyclopedia of Chemical Technology, John Wiley & Sons, Inc.; U.S. Pat. Nos. 4,288,579; 4,619,981; 4,752,597; 4,980,431; 5,324,800; 5,644,008; 5,684,097; 5,714,555; 5,618,886; 5,804,679; 6,034,188; 6,121,182; 6,121,402; 6,204,345; 6,437,063; 6,458,900; 6,486,275; 6,555,494; and references cited therein. The disclosures in the foregoing documents pertaining to preparation of polyolefin polymers or resins are incorporated herein by reference. If the flammable resin is a polyolefin, it is preferably a polyethylene or polypropylene homo or copolymer.

The flame retarded formulations of the present invention can also include any one or more conventional additives such as one or more flame retardant synergists, antioxidants, UV stabilizers, pigments, impact modifiers, fillers, acid scavengers, blowing agents, and the like, some of which are described in detail below.

The methods by which the pellets or compositions of the present invention and optional components are blended, combined, used to form, incorporated or added to the flammable resin and the method by which any molded or extruded articles are formed therefrom is not critical to the present invention and can be any known in the art so long as the method selected involves uniform mixing and/or molding. For example, the pellets or compositions can be combined with the flammable resin by melt blending, combining them in extrusion devices, or similar techniques. Also, each of the above components, and optional components if used, can be mixed using a Buss Ko-kneader, internal mixers, Farrel continuous mixers or twin screw extruders or in some cases also single screw extruders or two roll mills, and then the flame retarded polymer formulation molded in a subsequent processing step. Further, the molded article of the flame retarded polymer formulation may be used after fabrication for applications such as stretch processing, emboss processing, coating, printing, plating, perforation or cutting. The kneaded mixture can also be inflation-molded, injection-molded, extrusion-molded, blow-molded, press-molded, rotation-molded or calender-molded.

In the case of an extruded article, any extrusion technique known to be effective with the flammable resin(s) used in the flame retarded polymer formulation can be employed.

Fillers and Reinforcing Fibers

Non-limiting examples of fillers or reinforcing fibers suitable for use herein include low alkali E-glass, carbon fibers, potassium titanate fibers, glass spheres or microballoons, whiskers, talc, wollastonite, kaolin, chalk, calcined kaolin, and the like. The amounts of the optional fillers or reinforcing fibers are not critical to the present invention and can be any amount commonly used in the art and can be varied to suit the needs of any given situation. When used, the amount of fillers or reinforcing fibers typically ranges from about 0 wt. % to about 50 wt. %, based on the flame retarded resin formulation. Preferably the amount of fillers or reinforcing fibers ranges from about 10% wt. % to about 50 wt. %, on the same basis, and most preferably in a range of about 20 wt. % to about 40 wt. %, on the same basis.

Synergists

Non-limiting examples of synergists suitable for use herein include (i) antimony compounds such as antimony oxide, antimony trioxide, antimony tetroxide, antimony pentoxide, and sodium antimonate; (ii) tin compounds such as tin oxide and tin hydroxide; (iii) molybdenum compounds such as molybdenum oxide and ammonium molybdenum; (iv) zirconium compounds such as zirconium oxide and zirconium hydroxide; (v) boron compounds such as zinc borate and barium metaborate; (vi) synthetic and/or natural zeolites; and (vii) iron oxides. Other components that may be used as synergists include hydrotalcites, hindered phenolic antioxidants, and light stabilizers. The amounts of the optional synergists are not critical to the present invention and can be any amount commonly used in the art and can be varied to suit the needs of any given situation. Generally, the amount of the optional synergists typically ranges from about 0 wt. % to about 12 wt. %, based on the total weight of the flame retarded formulation if a V-0 rating according to test UL-94 is desired. Preferably the amount of the optional synergists ranges from about 2 wt. % to about 8 wt. %, on the same basis, and most preferably in a range of about 3 wt. % to about 6 wt. %, on the same basis, if a V-0 rating according to test UL-94 is desired. In embodiments when the flame retardant used is a halogenated diphenyl alkane as described above, especially when the flame retardant is decabromodiphenyl alkane, the flame retarded formulations also comprise antimony oxide. If the flame retarded formulations contain antimony oxide, it is preferred that the amount of antimony oxide used be in a ratio in the range of from about 1 part antimony oxide to about 1 part flame retardant (1:1 antimony oxide to flame retardant) to about 4 parts antimony oxide to about 1 part flame retardant (4:1 antimony oxide to flame retardant), if a V-0 rating according to test UL-94 is desired. Preferably, the amount of antimony oxide used is in the range of from about 2 parts antimony oxide to about 1 part flame retardant (2:1 antimony oxide to flame retardant) to about 4 parts antimony oxide to about 1 part flame retardant (4:1 antimony oxide to flame retardant), if a V-0 rating according to test UL-94 is desired. More preferably, the amount of antimony oxide used is about 3 parts antimony oxide to about 1 part flame retardant, if a V-0 rating according to test UL-94 is desired.

Anti-Dripping Agents

Anti-dripping agents are typically and preferably polymeric compounds. Although various materials are available for this use, preferred anti-dripping agents include fluoropolymers and ethylene/methacrylic acid copolymers. Non-limiting examples of materials of this type include fluoropolymers such as polytetrafluoroethylene or related materials available commercially from DuPont under the TEFLON® line of materials such as TEFLON® T807N and TEFLON® 6C-N. Non-limiting examples of ethylene/methacrylic acid copolymers are those available commercially from DuPont under the SURLYN® line of materials such as SURLYN® 8920. The amounts of the optional formulation compounds and anti-dripping agents are not critical to the present invention and can be any amount commonly used in the art and can be varied to suit the needs of any given situation.

The above description is directed to several embodiments of the present invention. Those skilled in the art will recognize that other embodiments, which are equally effective, could be devised for carrying out the spirit of this invention. It should also be noted that preferred embodiments of the present invention contemplate that all ranges discussed herein include ranges from any lower amount to any higher amount.

The following examples will illustrate the present invention, but are not meant to be limiting in any manner.

EXAMPLES

In order to prove the effectiveness of the present invention, several flame retarded formulations were produced from pellets or compositions according to the present invention. The flame retardant used in the testing was Saytex® 8010 flame retardant, available commercially from the Albemarle® Corporation, and sometimes referred to herein as Saytex® 8010 powder since the flame retardant is typically sold in this form.

In the following examples, the flame retarded formulation was made by mixing the base resin (HIPS, ABS, PA6 or PBT), Saytex® 8010 powder or pelletized flame retardant, designated as XP-7670 in the examples, antimony oxide and other ingredients if needed in a tumble blender for approx, 10 minutes, thus forming what is referred to in the examples as a "mixed compound". The actual components used and their amounts are listed in the Tables below.

As noted above, XP-7670 is a pelletized flame retardant suitable for use in the present invention and contains as its flame retardant constituent Saytex® 8010 flame retardant. The XP-7670 pellets used in the following examples was produced by combining Engage® 8407 resin, available commercially from The Dow Chemical Company and Saytex® 8010 flame retardant in a Farrel Continuous Mixer ("FCM") extruder from Farrel Corporation. The Saytex® 8010 and Engage® 8407 resin were fed separately via weigh feeders into the hopper of a 6 inch FCM extruder from Farrel Corporation. The mixed compound in the form of a continuous rope was strained through a 10 in. single screw extruder. The melt temperature of the rope was maintained at 170-200° C. The extruder profile temperature was set at 190-200° C. The stranded material from the die was pelletized using a Gala underwater pelletizer. The amount of Saytex® flame retardant present in the pellets used in each examples is indicated in the examples below.

Example 1

In order to prove the effectiveness of the present invention, several flame retarded formulations, designated as A-H, were produced from Dow 801 and Dow F220 HIPS resins. Bright-Sun HB is an antimony oxide available commercially from China Antimony Chemicals Co., Ltd.

In order to provide for a flame retardant formulation suitable for testing, the HIPS resin and the flame-retardant, in addition to the other compounds indicated in Tables 1 and 2, below, were mixed in a plastic bag using a tumble mixer for approximately 10 minutes prior to extrusion. The mixture was then compounding on a Werner & Pfleiderer ZSK30 twin-screw extruder at 175 rpm and a feed rate of 8 kg/hr. The temperature profile of the compounder was 175-175-190-215-215° C. A trap was used to capture any volatiles if there was any. The extruded strand was first cooled down by passing it through an iced-water bath and then pelletized on-line. All flame retarded formulations were injection molded using a Battenfeld BA350 CD injection-molding machine. The temperature profile of the injection-molding machine was 195-195-205° C.

The exact amounts of each component, the results of the UL-94 testing, and the results of mechanical and physical tests, according to the methods given in the Table, are contained in Tables 1 and 2 below. All amounts given in reference to a particular component are in wt. %, based on the total weight of the flame-retarded formulation. In the Examples, A, B, D, F and G are comparative Examples, and C, E, and H are of the present invention. It should also be noted that the XP-7670 flame retardant used in this example contained 87 wt. % Saytex® 8010, based on the total weight of the pellets.

Testing was performed on samples according to the following ASTM test standards: Tensile Strength (D638) specimen type 1; Flexural Strength (D790) method 1; Heat Deflection Temperature under Load (D648) ⅛" at 264 psi; Notched-Izod Impact Strength (D256) method A; and Melt Flow Rate (D1238) procedure A, 200° C./5 kg. The UL-94 flammability test was performed on ⅛" bar samples.

TABLE 1

| Ingredient | A | B | C | D | E |
|---|---|---|---|---|---|
| Dow F801 | 84.0 | 84.0 | 84.0 | — | — |
| Dow F220 | — | — | — | 84.0 | 84.0 |
| Bright Sun HB ATO | 4.0 | 4.0 | 4.0 | 4.0 | 4.0 |
| Saytex 8010 powder | 12.0 | 11.0 | — | 12.0 | — |
| XP-7670 (87/13) | — | — | 12.0 | — | 12.0 |

TABLE 1-continued

| Ingredient | | | A | B | C | D | E |
|---|---|---|---|---|---|---|---|
| Property | Test Method | Units | A | B | C | D | E |
| Flammability | | | | | | | |
| UL-94 | UL 94 1/8" | Pass/Fail | V-0 | V-2 | V-0 | V-0 | V-0 |
| | | seconds | 9 | 24 | 19 | 8 | 9 |
| Thermal Properties | | | | | | | |
| Melt Flow Index | ASTM D1238 | g/10 min | 8.2 | 8.3 | 8.3 | 6.1 | 6.5 |
| HDT | ASTM D 648 @ 120° C./hr | ° C. | 73.2 | 73.2 | 73.3 | 73.7 | 73.1 |
| Mechanical Properties | | | | | | | |
| Tensile Strength | ASTM D 638 | psi × 10^3 | 2.9 | 2.9 | 2.9 | 3.1 | 3.1 |
| Tensile Modulus | ASTM D 638 | psi × 10^5 | 3.2 | 3.3 | 3.0 | 3.3 | 3.1 |
| Elongation at yield | ASTM D 638 | % | 1.1 | 1.2 | 1.2 | 1.2 | 1.2 |
| Elongation at Break | ASTM D 638 | % | 26.8 | 30.8 | 49.6 | 23.4 | 40.5 |
| Flexural Strength | ASTM D 790 | psi × 10^3 | 5.9 | 5.8 | 5.7 | 6.0 | 5.8 |
| Flexural Modulus | ASTM D 790 | psi × 10^5 | 3.2 | 3.1 | 3.0 | 3.2 | 3 |
| Izod Impact | ASTM D 256 | ft-lb/in | 1.1 | 1.2 | 1.3 | 0.9 | 1.1 |

TABLE 2

| Ingredient | | | F | G | H |
|---|---|---|---|---|---|
| Dow 801 | | | 84.0 | 84.0 | 84.0 |
| Bright Sun HB ATO | | | 4.0 | 4.0 | 4 |
| Saytex 8010 powder | | | 12.0 | 10.4 | — |
| Engage 8407 | | | — | 1.6 | — |
| XP-7670 (87/13) | | | — | — | 12 |
| Property | Test Method | Units | | | |
| Flammability | | | | | |
| UL-94 | UL 94 1/8" | Pass/Fail | V-0 | V-2 | V-0 |
| | | seconds | 8 | 51 | 11 |
| Thermal Properties | | | | | |
| Melt Flow Index | ASTM D1238 | g/10 min | 8.6 | 8.7 | 8.8 |
| HDT | ASTM D 648 @ 120° C./hr | ° C. | 72.5 | 72.0 | 72.2 |
| Mechanical Properties | | | | | |
| Tensile Strength | ASTM D 638 | psi × 10^3 | 2.9 | 2.8 | 2.8 |
| Tensile Modulus | ASTM D 638 | psi × 10^5 | 3.2 | 3.1 | 3.2 |
| Elongation at yield | ASTM D 638 | % | 1.2 | 1.2 | 1.1 |
| Elongation at Break | ASTM D 638 | % | 28.7 | 32.0 | 50 |
| Flexural Strength | ASTM D 790 | psi × 10^3 | 5.8 | 5.7 | 5.7 |
| Flexural Modulus | ASTM D 790 | psi × 10^5 | 3.2 | 3.0 | 3.1 |
| Izod Impact | ASTM D 256 | ft-lb/in | 1.1 | 1.2 | 1.1 |
| Gardner Impact | ASTM D 3209 | in · lb/in | 36 | 48 | 59 |

As can be seen in Table 1, comparative examples A and B, Saytex® 8010 powder provides for a V-0 and V-2, respectively, in Dow F801 HIPS resin. However, at a 12 wt. % loading of XP-7670, example C provides for a V-0 rating. In example C, the actual loading of 8010 flame retardant is 10.44 wt. % since XP-7670 contains 87 wt. % Saytex® 8010. Thus, while a loading level of 11 wt. % Saytex® 8010 powder does not provide for a V-0, a flame retardant loading level of 10.44 wt. % Saytex® 8010, provides for a flame retarded formulation that does provide a V-0, when the Saytex® 8010 is derived from a pellet/composition according to the present invention. Likewise, when comparing examples D and E, flame retarded formulations made using Dow F220 HIPS resins, the flame retarded formulation according to present invention, E, provided for flame retardant properties similar to those of the Saytex® 8010 powder-containing flame retarded formulation, D, while still providing for similar mechanical and thermal properties. However, it should be noted that flame retarded formulation E contains only 10.44 wt. % Saytex® 8010 flame retardant because XP-7670 contains 87 wt. % Saytex® 8010.

Comparative Example F again demonstrates that at a 12 wt. % loading of Saytex® 8010 powder and 4 wt. % antimony oxide, a flame retarded formulation containing only these components can provide for a V-0. Example H, also shows that in Dow 801 resin, a formulation containing 12 wt. % XP-7670, i.e. 10.44 wt. % of Saytex® 8010 powder, also provides for a V-0 and equivalent/superior mechanical and thermal properties. However, in an effort to prove that the benefits achieved by the present invention are attributable to the use of the pellets/compositions described herein, the individual components that make up XP-7670 were blended with the Dow 801 resin and antimony oxide without first pre-blending or pelletizing the of Saytex® 8010 powder and Engage® resin. As can be seen in comparative example G, a formulation made in this manner does not provide for a V-0 flame retardant rating. However, Example H, made by using a pellet containing the Engage® resin and Saytex® 8010 powder in the exact same amounts as used in G does provide for a V-0.

Example 2

In order to prove the effectiveness of the present invention in ABS resins, several flame retarded formulations, designated as I and J, were produced from Dow 342EZ ABS resin. AT-181 is a commercial antioxidant available from the Albemarle Corporation under the tradename ALBlend®.

In order to provide for a flame retardant formulation suitable for testing, the ABS resin was first dried for four hours at 80° C. The dried ABS and other components, as indicated in Table 3, were mixed in a plastic bag using a tumble mixer for approximately 10 minutes prior to extrusion. The components were then compounded on a Werner & Pfleiderer ZSK30 twin-screw extruder at 175 rpm and a feed rate of 8 kg/hr. The temperature profile of the extruder was 190-210-210-220-220° C. A trap was used to capture any volatiles if there was any. The extruded strand was first cooled down by passing through an iced-water bath and then pelletized on-line. The pelletized flame retardant formulation was dried for 4 hours at 80° C. and used for molding in a Battenfeld BA350

CD injection-molding machine. The temperature profile of the injection molder was 204-216-221° C. The mold temperature was 40° C.

The exact amounts of each component, the results of the UL-94 testing, and the results of mechanical and physical tests, according to the methods given in Table 3. All amounts given in reference to a particular component are in wt. %, based on the total weight of the flame retarded formulation. In Example 2, I is a comparative Example, and J is of the present invention. It should also be noted that the XP-7670 flame retardant used in this example contained 85 wt. % Saytex® 8010, based on the total weight of the pellets.

Testing was performed on samples according to the following ASTM test standards: Tensile Strength (D638) specimen type 1; Flexural Strength (D790) method 1; Heat Deflection Temperature under Load (D648) ⅛" at 264 psi; Notched-Izod Impact Strength (D256) method A; and Melt Flow Rate (D1238) procedure A, 230° C./3.8 kg. The UL-94 flammability test was performed on ⅛" bar samples.

As can be seen in Table 3, below, Comparative example I provides for a flame retarded formulation meeting the V-0 requirements at a 14.6 wt. % loading level of Saytex® 8010. Likewise, example J, also provides for a flame retarded formulation meeting the V-0 requirements at a loading level of 14.6 wt. % of XP-7670, and J provides a flame retarded formulation having equivalent/superior mechanical and thermal properties when compared to the comparative flame retarded formulation I. However, it should be noted that flame retarded formulation J contains only 12.4 wt. % Saytex® 8010 flame retardant because XP-7670 contains 85 wt. % Saytex® 8010.

TABLE 3

| Ingredient | | | I | J |
|---|---|---|---|---|
| Dow 342EZ | | | 80.8 | 80.8 |
| Bright Sun HB ATO | | | 4.5 | 4.5 |
| ALBlend ® AT-181 | | | 0.1 | 0.1 |
| Saytex 8010 powder | | | 14.6 | — |
| XP-7670 | | | — | 14.6 |
| Property | Test Method | Units | | |
| Flammability | | | | |
| UL-94 | UL 94 ⅛" | Pass/Fail seconds | V-0 7 | V-0 11 |
| Thermal Properties | | | | |
| Melt Flow Index, 230° C./3.8 Kg | ASTM D1238 | g/10 min | 7.1 | 7.2 |
| HDT, 264 psi | ASTM D 648 @ 120° C./hr | ° C. | 74.9 | 75.2 |
| Mechanical Properties | | | | |
| Tensile Strength | ASTM D 638 | psi × 10^3 | 4.7 | 4.5 |
| Tensile Modulus | ASTM D 638 | psi × 10^4 | 32.8 | 31.7 |
| Elongation at yield | ASTM D 638 | % | 2.1 | 2.2 |
| Elongation at Break | ASTM D 638 | % | 36.1 | 46.2 |
| Flexural Strength | ASTM D 790 | psi × 10^3 | 8.3 | 8.1 |
| Flexural Modulus | ASTM D 790 | psi × 10^4 | 32.2 | 3.7 |
| Izod Impact | ASTM D 256 | ft-lb/in | 1.6 | 1.8 |

Example 3

In order to prove the effectiveness of the present invention in PBT resins, several flame retarded formulations, designated as K and L, were produced from Crastin® 6134, a PBT resin available commercially from DuPont. The formulations also contained White Star N antimony oxide, available commercially from the Campine Company, T807N TEFLON®, available from DuPont, and Vetrotex 952 glass fibers, available from Saint-Gobain Vetrotex International.

The exact amounts of each component, the results of the UL-94 testing, and the results of mechanical and physical tests, according to the methods given in Table 4, are described in Table 4, below. All amounts given in reference to a particular component are in wt. %, based on the total weight of the flame-retarded formulation. In Example 3, K is a comparative Example, and L is of the present invention. It should also be noted that the XP-7670 flame retardant used in this example contained 85 wt. % Saytex® 8010, based on the total weight of the pellets.

In order to provide for a flame retardant formulation suitable for testing, the PBT resin was first dried for 12 hours at 105° C. The dried PBT, flame-retardant, and additional components, as indicated in Table 4, were mixed in a plastic bag using a tumble mixer for approximately 10 minutes prior to extrusion. The Verotex 952 fiberglass was added downstream using a separate weigh feeder. The mixed components were then compounded on a Werner & Pfleiderer ZSK25 twin-screw extruder at 250 rpm and a feed rate of 16 kg/hr. The temperature profile of the extruder was 205-225-240-235-240-240-240-240° C. The extruded strand was first cooled down by passing it through an iced-water bath and then pelletized on-line. The pelletized flame retardant formulation was dried for 12 hours at 80° C. and used for molding in a Demag injection-molding machine. The temperature profile of the injection-molding machine was 250-260-260-260° C. The mold temperature was 70° C.

Testing was performed on samples according to the test procedures indicated in the Table.

As can be seen in Table 4, below, Comparative example K provides for a flame retarded formulation meeting the V-0 requirements at a 10.5 wt % loading level of Saytex® 8010. Likewise, example L, also provides for a flame retarded formulation meeting the V-0 requirements at a loading level of 10.5 wt % of XP-7670, and L provides a flame retarded formulation having equivalent/superior mechanical and thermal properties when compared to the comparative flame retarded formulation K. However, it should be noted that flame retarded formulation L contains only 8.9 wt. % Saytex® 8010 flame retardant because XP-7670 contains 85 wt. % Saytex® 8010.

TABLE 4

| Ingredient | | | K | L |
|---|---|---|---|---|
| Crastin 6134 | | | 54.1 | 54.1 |
| White Star N (Sb$_2$O$_3$) | | | 5.0 | 5.0 |
| Teflon T807N | | | 0.4 | 0.4 |
| Saytex 8010 powder | | | 10.5 | — |
| XP-7670 | | | — | 10.5 |
| Vetrotex 952 (Glass Fibers) | | | 30.0 | 30.0 |
| Property | Test Method | Units | | |
| Flammability | | | | |
| UL-94 | UL94 @ 0.8 mm | Pass/Fail seconds | V-0 0/0 | V-0 0/0 |
| Thermal Properties | | | | |
| Melt Flow Index, 250° C./2.16 Kg | ISO 1133 | g/10 min | 13.2 | 13.3 |
| Glow Wire Flame test @ 960° C., 0.8 m | IEC 60695-2-12 | | Pass | Pass |
| Glow Wire Ignition Temp. @ 0.8 mm | IEC 60695-2-13 | ° C. | 725 | 725 |

TABLE 4-continued

| Ingredient | | | K | L |
|---|---|---|---|---|
| Mechanical Properties | | | | |
| Tensile Strength | ISO 527 | MPa | 153.7 | 144.3 |
| Tensile Modulus | ISO 527 | GPa | 11.3 | 10.7 |
| Elongation at Break | ISO 527 | % | 2.7 | 3.0 |
| Notched Izod, 4 mm/23° C. | ISO 180 | kJ/m$^2$ | 9.6 | 10.1 |
| Unnotched Izod 4 mm/23° C. | ISO 180 | kJ/m$^2$ | 53.5 | 54.3 |

Example 4

In order to prove the effectiveness of the present invention in polyamide resins, several flame retarded formulations, designated as M and N, were produced from Durethan B29, available commercially from Lanxess Deutschland GmbH. The formulations also contained White Star N antimony oxide, T807N TEFLON®, and Verotex 952 glass fibers.

The exact amounts of each component, the results of the UL-94 testing, and the results of mechanical and physical tests, according to the methods given in Table 5, are described in Table 5, below. All amounts given in reference to a particular component are in wt. %, based on the total weight of the flame-retarded formulation. In Example 4, M is a comparative Example, and N is of the present invention. It should also be noted that the XP-7670 flame retardant used in this example contained 85 wt. % Saytex® 8010, based on the total weight of the pellets.

In order to provide for flame retardant formulations suitable for testing, the PA6 resin was first dried for 12 hours at 80° C. The dried PA6, flame-retardant, and other components were then mixed in a plastic bag using a tumble mixer for approximately 10 minutes prior to extrusion. The Verotex 952 fiberglass was added downstream using a separate weigh feeder. The mixture was then compounded using a Werner & Pfleiderer ZSK25 twin-screw extruder at 250 rpm and a feed rate of 16 kg/hr. The temperature profile of the extruder was 210-230-240-245-240-245-245-245-245° C. The extruded strand was first cooled down by passing it through an iced-water bath and then pelletized on-line. The pelletized flame retardant formulation was first dried for 12 hours at 80° C., and the dried flame retardant formulation was used for molding in a Demag injection-molding machine. The temperature profile of the injection-molding machine was 250-255-260-260° C. The mold temperature was 120° C.

Testing was performed on samples according to the test procedures indicated in the Table.

As can be seen in Table 5, below, Comparative example M provides for a flame retarded formulation meeting the V-0 requirements at a 15.0 wt. % loading level of Saytex® 8010. Likewise, example N, also provides for a flame retarded formulation meeting the V-0 requirements at a loading level of 15.0 wt % of XP-7670, and N provides a flame retarded formulation having equivalent/superior mechanical and thermal properties when compared to the comparative flame retarded formulation K. However, it should be noted that flame retarded formulation N contains only 12.75 wt % Saytex® 8010 flame retardant because XP-7670 contains 85 wt. % Saytex® 8010.

TABLE 5

| Ingredient | | | M | N |
|---|---|---|---|---|
| Durethan B29 | | | 49.6 | 49.6 |
| White Star N (Sb$_2$O$_3$) | | | 5.0 | 5.0 |
| Teflon T807N | | | 0.4 | 0.4 |
| Saytex 8010 powder | | | 15.0 | — |
| XP-7670 | | | — | 15.0 |
| Vetrotex 952 (Glass Fibers) | | | 30.0 | 30.0 |
| Property | Test Method | Units | | |
| Flammability | | | | |
| UL-94 | UL94 @ 0.8 mm | Pass/Fail seconds | V-0 1/1 | V-0 1/1 |
| Thermal Properties | | | | |
| Melt Flow Index, 250° C./2.16 Kg | ISO 1133 | g/10 min | 7.1 | 7.8 |
| Glow Wire Flame test @ 960° C., 0.8 m | IEC 60695-2-12 | | Pass | Pass |
| Glow Wire Ignition Temp. @ 0.8 mm | IEC 60695-2-13 | ° C. | 800 | 825 |
| Mechanical Properties | | | | |
| Tensile Strength | ISO 527 | MPa | 175.2 | 169.0 |
| Tensile Modulus | ISO 527 | GPa | 11.4 | 11.0 |
| Elongation at Break | ISO 527 | % | 3.3 | 3.3 |
| Notched Izod, 4 mm/23° C. | ISO 180 | kJ/m$^2$ | 11.7 | 13.2 |
| Unnotched Izod 4 mm/23° C. | ISO 180 | kJ/m$^2$ | 69.6 | 71.5 |

Example 5

In order to prove the effectiveness of the present invention in polyolefin resins, several flame retarded formulations, designated as O, P, Q, and R, were produced from Profax 6523 and Profax 7523, polypropylene homopolymers and copolymers, respectively, available commercially from Lyondell-Basell Industries. The formulations also contained Bright Sun HB antimony oxide; Mistron Vapor Talc, available commercially from Cyprus Industrial Minerals; Ethanox® 310 and Ethanox® 338, as indicated in Table 6, both antioxidants available commercially from the Albemarle® Corporation.

In order to provide for flame retardant formulations suitable for testing, the polyolefin resin and additional components, as indicated in Table 6 below, were mixed in a plastic bag using a tumble mixer for approximately 10 minutes prior to extrusion. The mixture was then compounded using a Werner & Pfleiderer ZSK30 twin-screw extruder (L/D ratio of 27) at 175 rpm and a feed rate of 8 kg/hr. The temperature profile of the twin-screw extruder was 175-175-190-215-215° C. The extruded strand was first cooled down by passing it through an iced-water bath and then pelletized on-line. All formulations were injection molded using a Battenfeld BA350 CD injection-molding machine. The temperature profile of the injection-molding machine was 195-195-205° C. for most of the samples. The mold temperature was 40° C.

The exact amounts of each component, the results of the UL-94 testing, and the results of mechanical and physical tests, according to the methods given in Table 6, are contained in Table 6, below. All amounts given in reference to a particular component are in wt. %, based on the total weight of the flame-retarded formulation. In Example 4, M is a comparative Example, and N is of the present invention. It should be noted that the XP-7670 flame retardant used in this example contained 86 wt. % Saytex® 8010, based on the total weight of the pellets.

As can be seen in Table 6, below, Comparative example O and example P of the present invention both provided for a flame retarded formulation meeting the V-0 requirements at a 22.0 wt. % loading level of Saytex® 8010 and a 22.0 wt. % loading level of XP-7670, respectively. However, it should be noted that flame retarded formulation P contains only 18.92 wt % Saytex® 8010 flame retardant because XP-7670 contains 86 wt. % Saytex® 8010, and P provides a flame retarded formulation having equivalent/superior mechanical and thermal properties when compared to the comparative flame retarded formulation O.

Likewise, comparative example Q and example R of the present invention both provided for a flame retarded formulation meeting the V-0 requirements at a 22.0 wt % loading level of Saytex® 8010 and a 22.0 wt. % loading level of XP-7670, respectively. However, it should be noted that flame retarded formulation R contains only 18.92 wt % Saytex® 8010 flame retardant because XP-7670 contains 86 wt % Saytex® 8010, and R provides a flame retarded formulation having equivalent/superior mechanical and thermal properties when compared to the comparative flame retarded formulation Q.

TABLE 6

| Ingredient | | | O | P | Q | R |
|---|---|---|---|---|---|---|
| Profax 6523 | | | 56.8 | 56.8 | — | — |
| Profax 7523 (Co PP) | | | — | — | 56.8 | 56.8 |
| Bright Sun HB ATO | | | 7.0 | 7.0 | 7.0 | 7.0 |
| Saytex ® 8010 powder | | | 22.0 | — | 22.0 | — |
| XP-7670 (86/14) | | | — | 22.0 | — | 22.0 |
| Mistron Vapor Talc | | | 14.0 | 14.0 | 14.0 | 14.0 |
| Ethanox ® 310 | | | 0.1 | 0.1 | 0.1 | 0.1 |
| Ethanox ® 368 | | | 0.1 | 0.1 | 0.1 | 0.1 |
| Property | Test Method | Units | A | B | C | D |
| Flammability | | | | | | |
| UL-94 | UL 94 1/8" | Pass/Fail | V-0 | V-0 | V-0 | V-0 |
| | | seconds | 9 | 11 | 10 | 23 |
| Thermal Properties | | | | | | |
| Melt Flow Index | ASTM D1238 | g/10 min | 3.3 | 3.2 | 3.2 | 3.5 |
| HDT | ASTM D 648 @ 120° C./hr | ° C. | 121.0 | 112.6 | 124.9 | 116.8 |
| Mechanical Properties | | | | | | |
| Tensile Strength | ASTM D 638 | psi × 10^3 | 3.5 | 3.4 | 4.2 | 4.0 |
| Tensile Modulus | ASTM D 638 | psi × 10^5 | 4.2 | 3.7 | 4.8 | 4.0 |
| Elongation at yield | ASTM D 638 | % | 3.4 | 4.7 | 4.2 | 5.2 |
| Elongation at Break | ASTM D 638 | % | 67.5 | 59.1 | 52.4 | 41.3 |
| Flexural Strength | ASTM D 790 | psi × 10^3 | 6.1 | 5.6 | 7.2 | 6.8 |
| Flexural Modulus | ASTM D 790 | psi × 10^5 | 3.1 | 2.5 | 3.5 | 3.0 |
| Izod Impact | ASTM D 256 | ft-lb/in | 0.67 | 0.88 | 0.36 | 0.53 |

What is claimed:

1. A method for producing a flame retardant formulation comprising combining, blending, incorporating or adding (1) a flammable resin or polymer to (2) flame retardant pellets or compositions thereby forming the flame retardant formulation; wherein said flame retardant pellets or compositions comprise at least one flame retardant and at least one alpha-olefin interpolymer, wherein said flame retardant is a halogenated diphenyl alkane, and wherein the amount of said flame retardant is greater than 80 wt % based on the total weight of the flame retardant pellets or compositions and wherein said alpha-olefin interpolymer is characterized by two or more of the following properties:

a) a density in the range of from about 0.85 to about 0.91
b) a molecular weight distribution, $M_w/M_n$, of less than about 3.5;
c) a processing index ("PI") in the range of about 0.01 kpoise to about 50 kpoise;
d) a melt index in the range of from about 0.01 grams/10 minutes (g/10 min) to about 1000 g/10 min;
e) an $I_{10}/I_2$ ratio up to about 50; and
f) a CDBI of greater than about 50 percent;

and wherein the amount of flame retardant in the flame retardant formulation is about 1-30 wt % based on the total weight of the flame retardant formulation.

2. The method according to claim 1 wherein said alpha-olefin interpolymer is an ethylene/alpha-olefin interpolymer and said alpha-olefin is selected from $C_3$-$C_{20}$ alpha-olefins and/or $C_4$-$C_{18}$ diolefins.

3. A flame retardant formulation comprising:
a) at least one flammable resin or polymer;
b) a pellet or composition formed from a flame retardant and at least one alpha-olefin interpolymer; wherein said flame retardant is a halogenated diphenyl alkane, and wherein the amount of said flame retardant is greater than 80 wt % based on the total weight of the flame retardant pellet or composition and
c) optionally, at least one additional component selected from flame retardant synergists, antioxidants, UV stabilizers, pigments, impact modifiers, fillers, acid scavengers, blowing agents, and the like;
wherein
i) test bars made from said flame retarded formulation have a flame retardant rating as determined by UL-94 equal to or greater than the flame retardancy of test bars made from a flame retarded formulation containing a) and said at least one flame retardant;
or
ii) test bars made from said flame retarded formulation have a flame retardant rating as determined by UL-94 equal to or greater than the flame retardancy of test bars made from a flame retarded formulation containing a), said at least one flame retardant and said at least one alpha-olefin interpolymer without initially forming a pellet or composition;

or iii) combinations of i) and ii); and wherein said alpha olefin interpolymer has a CDBI of greater than about 50 percent and a molecular weight distribution, $M_w/M_n$, of less than about 3.5;

and wherein the amount of flame retardant is about 1-30 wt % based on the total weight of the flame retardant formulation.

4. The flame retardant formulation according to claim 3 wherein said alpha-olefin interpolymer is an ethylene/alpha-olefin interpolymer and said alpha-olefin is selected from $C_3$-$C_{20}$ alpha-olefins and/or $C_4$-$C_{18}$ diolefins.

5. The flame retardant formulation according to claim 3 wherein said alpha-olefin interpolymer is characterized by:
   a) a density in the range of from about 0.85 to about 0.91
   b) a molecular weight distribution, $M_w/M_n$, of less than about 3.5;
   c) a processing index ("PI") in the range of about 0.01 kpoise to about 50 kpoise;
   d) a melt index in the range of from about 0.01 grams/10 minutes (g/10 min) to about 1000 g/10 min;
   e) an $I_{10}/I_2$ ratio up to about 50; and
   f) a CDBI of greater than about 50 percent.

6. The flame retardant formulation according to claim 3 wherein said flammable resin or polymer is a styrenic resin, a thermoplastic resin, a polyolefin resin, or combinations thereof.

7. The flame retardant formulation according to claim 3 wherein said flame retardant formulation further comprises c).

8. The flame retardant formulation according to claim 3 wherein said flammable resin or polymer is a thermoplastic or styrenic resin and wherein:
   i) test bars made from said flame retarded formulation have an IZOD Impact Strength as determined according to test method ASTM D256 or ISO 180 equal to or greater than the IZOD Impact Strength of test bars made from a flame retarded formulation containing a) and said at least one flame retardant; the Melt Flow Rate, as determined by ASTM D1238 or ISO 1133, of said flame retarded formulation is equal to or greater than the Melt Flow Rate of a flame retarded formulation containing a) and said at least one flame retardant; and the Elongation at Break, as determined by ASTM D638 or ISO 527, of said flame retarded formulation is equal to or greater than the Melt Flow Rate of a flame retarded formulation containing a) and said at least one flame retardant;

or ii) test bars made from said flame retarded formulation have an IZOD Impact Strength as determined according to test method ASTM D256 or ISO 180 equal to or greater than the IZOD Impact Strength of test bars made from a flame retarded formulation containing a) and b) without initially forming a pellet or composition from said at least one flame retardant and said at least one alpha-olefin interpolymer; the Melt Flow Rate, as determined by ASTM D1238 or ISO 1133, of said flame retarded formulation is equal to or greater than the Melt Flow Rate of a flame retarded formulation containing a) and b) without initially forming a pellet or composition from said at least one flame retardant and at least one alpha-olefin interpolymer; and the Elongation at Break, as determined by ASTM D638 or ISO 527, of said flame retarded formulation is equal to or greater than the Melt Flow Rate of a flame retarded formulation containing a), said at least one flame retardant and said at least one alpha-olefin interpolymer without initially forming a pellet or composition;

or iii) combinations of i) and ii).

9. A molded or extruded article made from the composition according to claim 3.

* * * * *